United States Patent
Kim et al.

(10) Patent No.: US 8,462,489 B2
(45) Date of Patent: Jun. 11, 2013

(54) CASE FOR PORTABLE COMMUNICATION DEVICE HAVING SLIDING MODULE PORTION

(75) Inventors: Won-Tae Kim, Gyeonggi-do (KR);
Sung-Ho Ahn, Seoul (KR);
Soon-Woong Yang, Seoul (KR)

(73) Assignee: Samsung Electronics Co., Ltd.,
Samsung-ro, Yeongtong-gu, Suwon-si,
Gyeonggi-do (KR)

( * ) Notice: Subject to any disclaimer, the term of this patent is extended or adjusted under 35 U.S.C. 154(b) by 324 days.

(21) Appl. No.: 12/898,919

(22) Filed: Oct. 6, 2010

(65) Prior Publication Data

US 2011/0132802 A1  Jun. 9, 2011

(30) Foreign Application Priority Data

Dec. 3, 2009  (KR) .................. 10-2009-0119381

(51) Int. Cl.
*G06F 1/16* (2006.01)

(52) U.S. Cl.
USPC .................. 361/679.01; 455/575.4; 206/701

(58) Field of Classification Search
USPC ......... 361/679.01; 455/575.1–575.8; 206/701
See application file for complete search history.

(56) References Cited

U.S. PATENT DOCUMENTS

| | | | | |
|---|---|---|---|---|
| 7,437,186 | B2 * | 10/2008 | Park | 455/575.4 |
| 7,916,473 | B2 * | 3/2011 | Jang | 361/679.55 |
| 2010/0177036 | A1 * | 7/2010 | Nam | 345/156 |
| 2010/0302716 | A1 * | 12/2010 | Gandhi | 361/679.01 |
| 2011/0275422 | A1 * | 11/2011 | Kemppinen | 455/575.4 |

* cited by examiner

*Primary Examiner* — Lisa Lea Edmonds
(74) *Attorney, Agent, or Firm* — Cha & Reiter, LLC

(57) ABSTRACT

Provided is a case for a portable communication device having a sliding module portion to avoid a folded (or wrinkled) portion, which may be generated when a case provided on the exterior of the portable communication device is folded or unfolded by rotation. To this end, a case for a portable communication device including a main body, a folder, and a hinge device for rotatably coupling the main body with the folder, includes a case portion for covering the exterior of the portable communication device, and a sliding module portion provided on the case portion, the sliding module portion unfolding a folded portion of the case portion generated when the folder is folded or unfolded by rotation, by sliding movement.

18 Claims, 8 Drawing Sheets

CASE FOR PORTABLE COMMUNICATION DEVICE HAVING SLIDING MODULE PORTION

CLAIM OF PRIORITY

This application claims the benefit under 35 U.S.C. §119 (a) of a Korean Patent Application filed in the Korean Intellectual Property Office on Dec. 3, 2009 and assigned Serial No. 10-2009-0119381, the entire disclosure of which is hereby incorporated by reference.

BACKGROUND OF THE INVENTION

1. Field of the Invention

The present invention relates to a case for a portable communication device which has a sliding module.

2. Description of the Related Art

Generally, "portable communication devices" refer to devices that are portable and enable users to perform wireless communications. Such portable communication devices include hand-held PCs (HHPs), CT-2 cellular phones, digital phones, PCS phones, and personal digital assistants (PDAs). These portable communication devices can be classified into several types. For example, wireless terminals can be a bar-type wireless terminal, a flip-type wireless terminal, a folder-type wireless terminal, and a slide-type wireless terminal. Each portable communication device is provided with an antenna unit, data input/output units, and data transmitting/receiving units. The data input unit usually includes a keypad with which data is input by means of depressing buttons via the user's fingers.

The folder-type portable communication device includes a main body, a folder, and a hinge device rotatably coupling the main body to the folder, such that the folder-type portable communication device is opened or closed by rotation of the folder.

For the folder-type portable communication device, a case made of synthetic resin and artificial leather is typically used.

As shown in FIG. 1, a case 10 for a folder-type portable communication device 1 includes an upper cover 11 coupled to a folder 3 and a lower cover 12 coupled to a main body 2. The lower cover 12 is coupled to the upper cover 11 by means of a coupling band 13, which extends from the upper cover 11.

However, the conventional case for the folder-type portable communication device, in case of being made of leather, has to be implemented separately and the coupling band for the leather case is folded (or wrinkled) and rises when the folder is opened from or closed to the main body.

As a result, the exterior design of a product is not elegant and cumbersome.

Accordingly, there is a need for a sliding device to avoid a folded (or wrinkled) portion which is associated when a folder is opened or closed by rotation.

SUMMARY OF THE INVENTION

An aspect of the present invention is to provide a case for a portable communication device having a sliding module to avoid an undesirable folded (or wrinkled) portion as in the prior art, thereby making the exterior design of a product elegant while protecting the exterior of the product and facilitating the use of the product.

According to an aspect of the present invention, there is provided a housing for a portable communication device including a main body, a folder, and a hinge device for rotatably coupling the main body with the folder, the case including a case portion for covering the exterior of the portable communication device, and a sliding module portion provided on the case portion, the sliding module portion unfolding a folded portion of the case portion generated when the folder is folded or unfolded by rotation, by sliding movement.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE INVENTION

Figure 1:
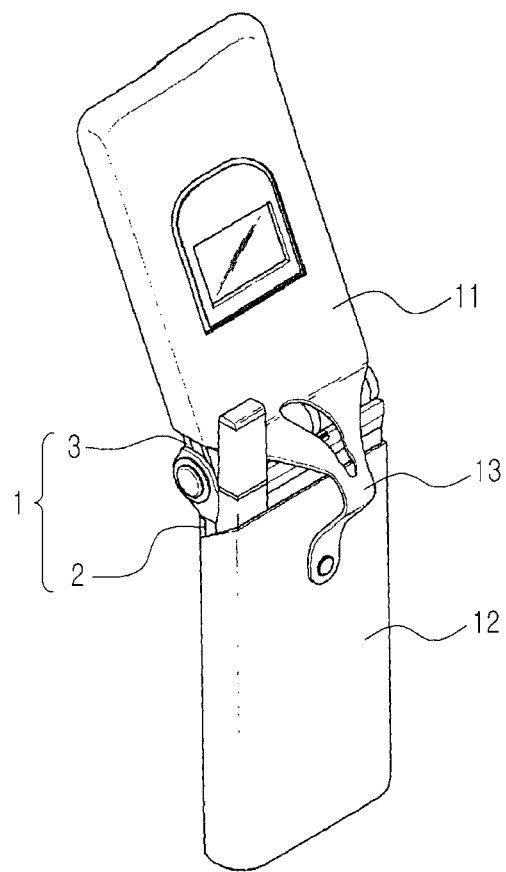
FIG. 1 is a perspective view showing a conventional case for a portable communication device.

Hereinafter, an exemplary embodiment of the present invention will be described in detail with reference to the accompanying drawings. The embodiment described herein and structures shown in the drawings are merely illustrative and do not cover every technical spirit of the invention. Therefore, it will be understood that various modifications which can substitute for the embodiment can be made at the time of filing the present application.

As shown in FIGS. 2 through 11, a case for a portable communication device according to the present invention includes a case portion 110 and a sliding module portion 120. The case portion 110 is provided on the exterior of a portable communication device 1a via means of the sliding module portion 120. The sliding module portion 120 is provided under the case portion 110 to flatten a folded (or wrinkled) portion of the case portion 110 typically generated when a folder 20 is folded or unfolded as stated in the prior art earlier.

The portable communication device 1a is illustrated as being of a folder type by way of example, which includes a main body 10, the folder 20, and a hinge device 30. However, the folder-type portable communication device according to the present invention is not limited to a mobile communication terminal, and can be applied to various forms of portable communication devices.

Further, examples of the portable communication device according to an embodiment of the present invention may include any type of information communication devices and multimedia devices such as mobile communication terminals operating based on communication protocols corresponding to various communication systems, Portable Multimedia Players (PMPs), MP3 players, digital broadcasting terminals, Personal Digital Assistants (PDAs), and smart phones, and application devices thereof.

Figure 2:
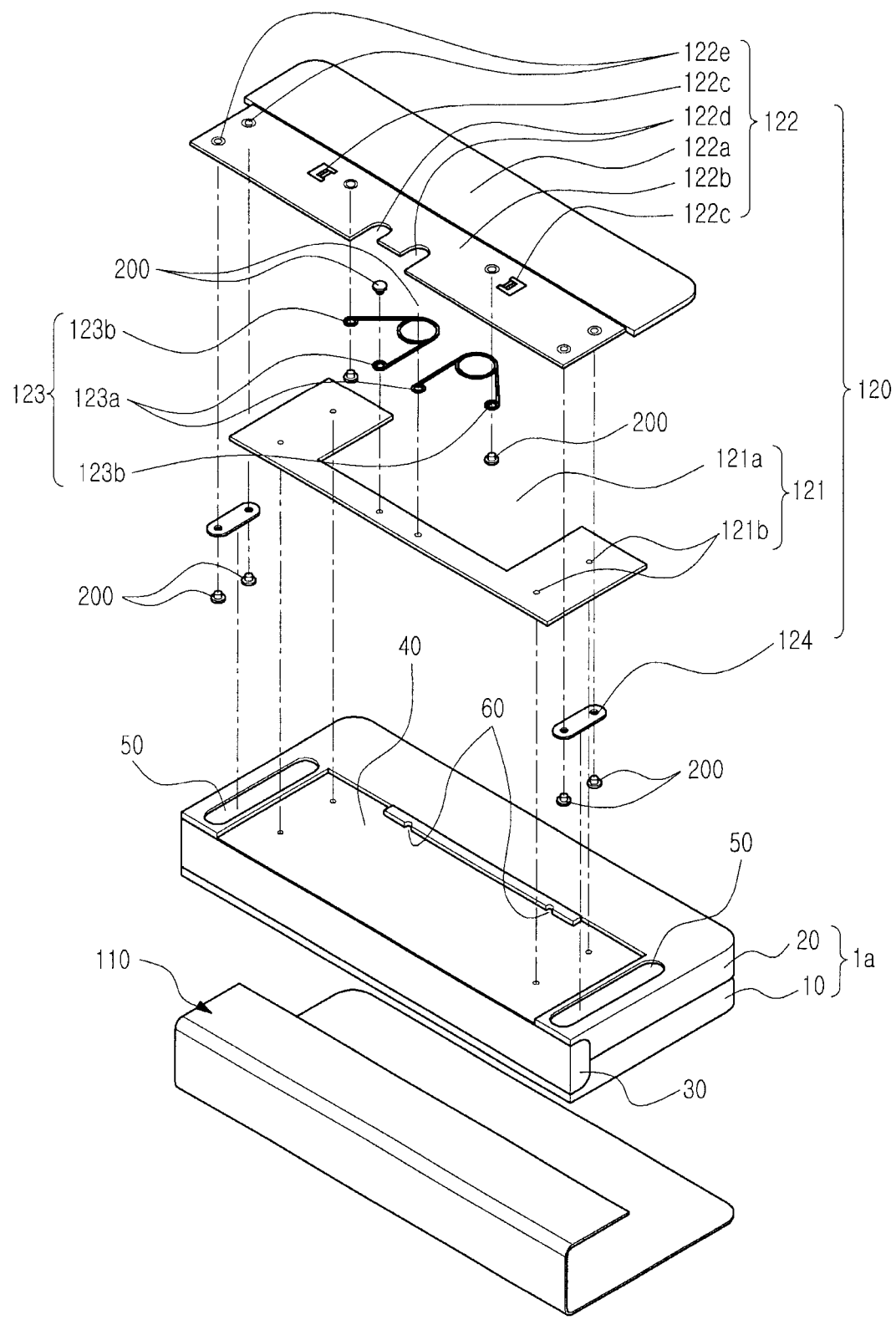
FIG. 2 is an exploded perspective view showing a structure of a case for a portable communication device including a sliding module according to an embodiment of the present invention.

As shown in FIG. 2, the case portion 110 may made of leather or other materials such as fabric or synthetic resin.

As shown in FIGS. 2 through 11, the sliding module portion 120 includes a base member 121, a sliding member 122, at least one elastic member 123, and at least one guide stopper portion 124. The base member 121 is mounted on the main body 10 or the folder 20 to slidably support the sliding member 122. The sliding member 122 is coupled to the case portion 110 and is slidably coupled to the base member 121 to slide together with the case portion 110. The elastic members 123 are provided between the base member 121 and the sliding member 122 to provide an elastic force for sliding the sliding member 122. The guide stopper portions 124 are coupled to the case portion 110 and the sliding member 122 to guide and restrict sliding of the sliding member 122.

Figure 3:
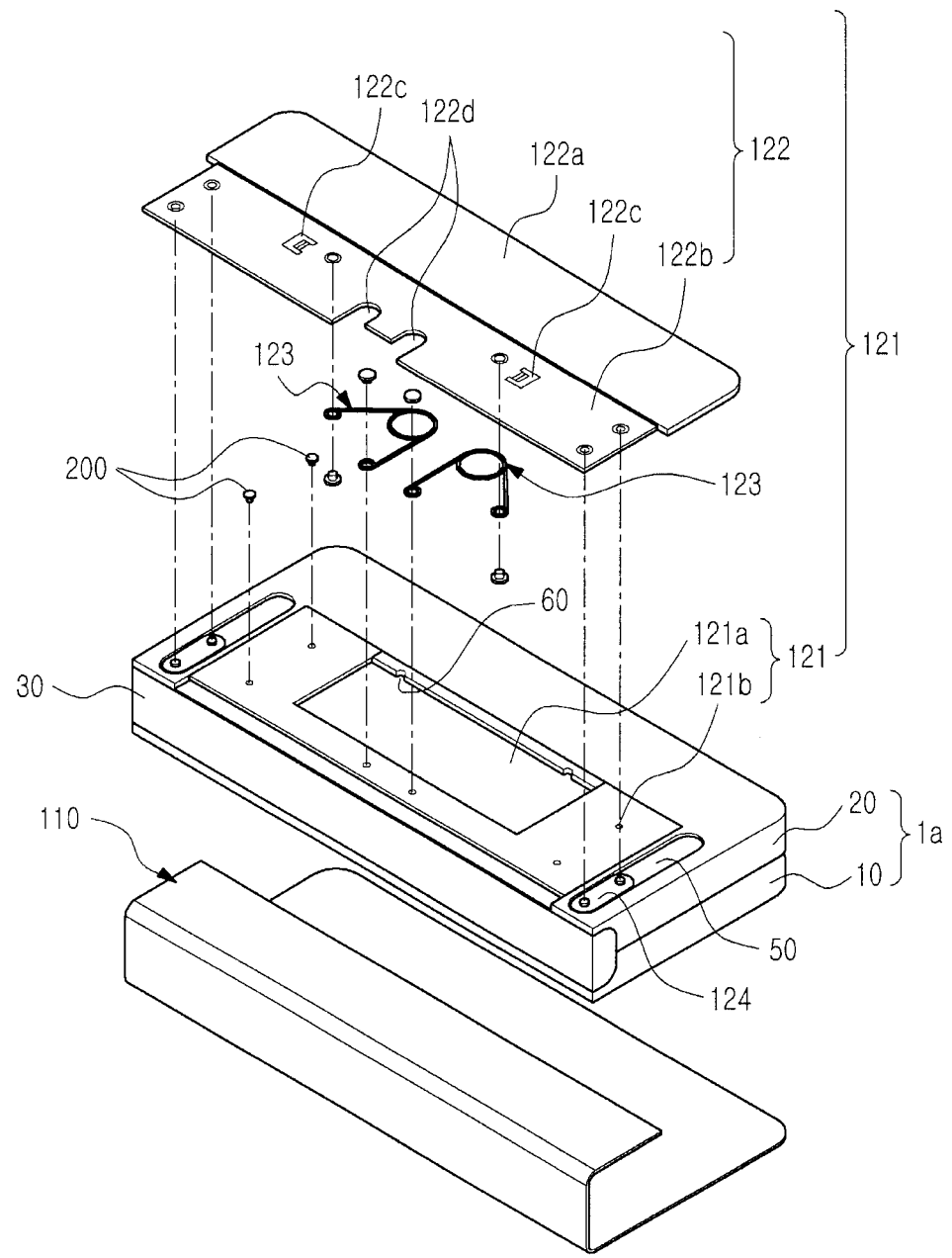
FIG. 3 is a perspective view showing a coupled state of a case for a portable communication device including a sliding module according to an embodiment of the present invention.
Figure 4:
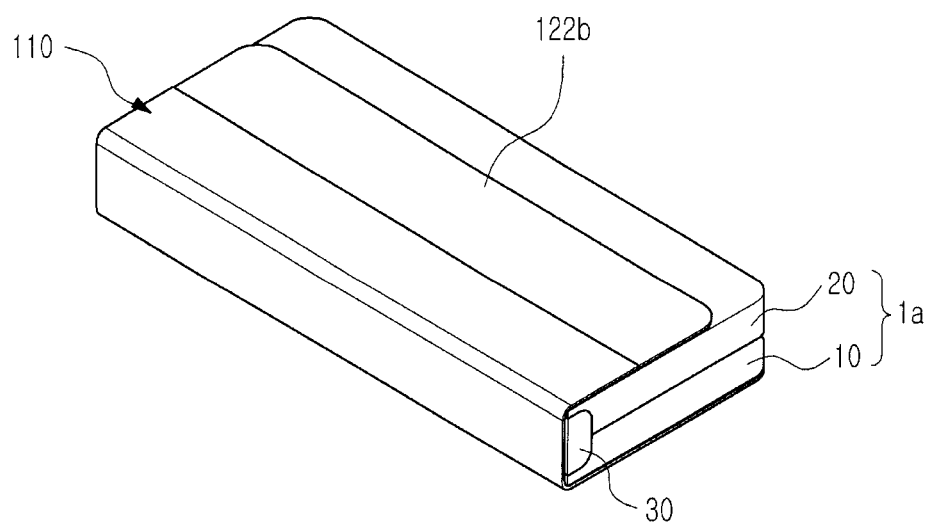
FIG. 4 is a perspective view showing a pre-operation (or before-operation) state of a case for a portable communication device including a sliding module according to an embodiment of the present invention.
Figure 5:
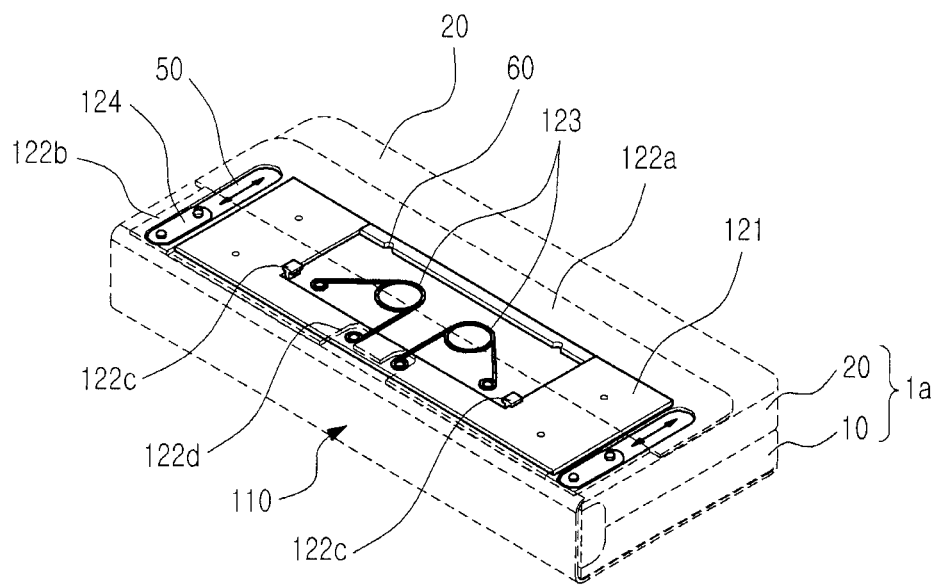
FIG. 5 is an internal perspective view showing a pre-operation state of a case for a portable communication device including a sliding module according to an embodiment of the present invention.
Figure 6:
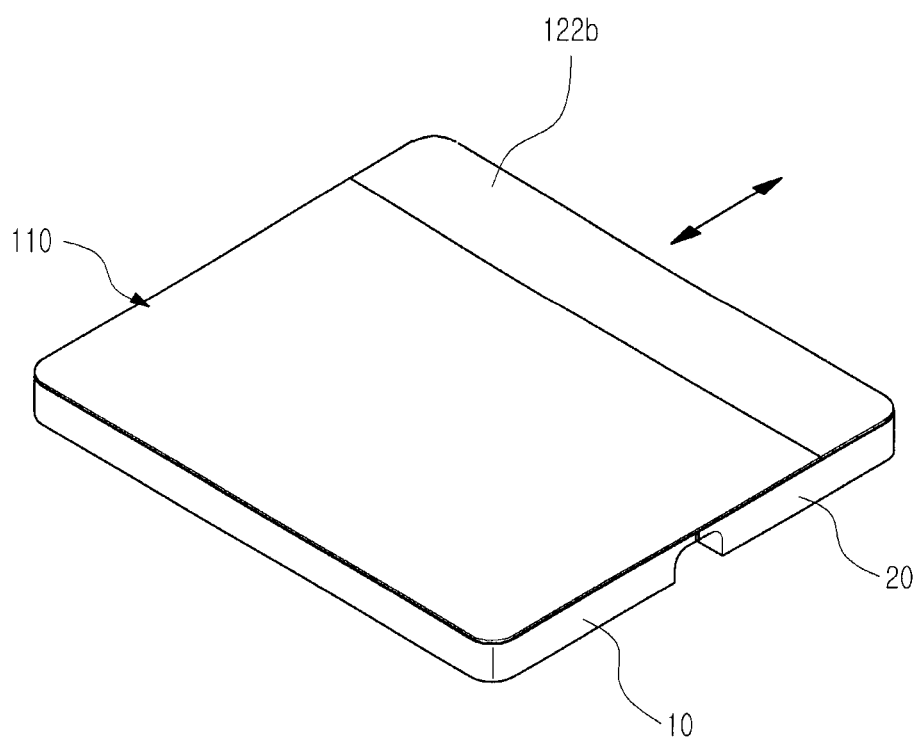
FIG. 6 is a perspective view showing a post-operation (or after-operation) state of a case for a portable communication device including a sliding module according to an embodiment of the present invention.

As shown in FIGS. 2 and 3, the main body 10 or the folder 20 is provided with a receiving recess 40 for receiving the base member 121, and movement grooves 50 for guiding and restricting sliding of the guide stopper portions 124.

As shown in FIGS. 2 and 3, in the base member 121 are formed an operation space 121a for accommodating the elastic members 123 and allowing the elastic members 123 to operate for providing an elastic force, and at least one screw holes 121b for screw-engagement with holes formed in the receiving recess 40.

As shown in FIGS. 2 through 11, the sliding member 122 includes a moving portion 122a outside and facilitates the sliding, a coupling portion 122b at an end of the moving portion 122a, which is coupled to the case portion 110 to slide together with the case portion 110, at least one guide support portions 122c for supporting a guiding movement of the guide stopper portions 124, and a coupling space 122d for allowing coupling between ends 123a of the elastic members 123 and the base member 121.

As shown in FIG. 2, the coupling portion 122b is formed to have a step with respect to the moving portion 122a such that it can be coupled to the case portion 110.

As shown in FIGS. 2 through 11, the ends 123a of the elastic members 123 are coupled to the base member 121, and other ends 123b of the elastic members 123 are coupled to the sliding member 122 to provide an elastic force for sliding of the sliding member 122 by compressing and stretching the elastic members 123.

As shown in FIGS. 2 through 11, the main body 10 or the folder 20 is provided with at least one stopper grooves 60 which are coupled to the other ends 123b of the elastic members 123 after sliding of the sliding member 122 to restrict the movement of the elastic members 123. The sliding member 122 includes at least one screw guide holes 122e with which screws 200 engaged with the guide stopper portions 124 are threadedly engaged such that the threaded screws 200 are guided to be engaged with the case portion 110.

Hereinafter, a detailed description will now be made of an operating process of the above-structured case for a portable communication device including a sliding module portion according to an embodiment of the present invention.

As shown in FIGS. 2 and 3, the case for a portable communication device including a sliding module portion includes the case portion 110 and the sliding module portion 120. The sliding module portion 120 includes the base member 121, the sliding member 122, the at least one elastic members 123, and the at least one guide stopper portions 124.

The base member 121 is received in the receiving recess 40 formed in the main body 10 or the folder 20.

As shown in FIGS. 2 and 3, because the screw holes 121b are formed in the base member 121, the screw holes 121b and the holes formed in the receiving recess 40 are matched, and the screws 200 are engaged into the holes. In this state, the ends 123a of the elastic members 123 are engaged with the base member 121, and the other ends 123b of the elastic members 123 are engaged with the sliding member 122.

The guide stopper portions 124 are coupled to the movement grooves 50.

In this state, the case portion 110 is coupled to cover the exterior of the main body 10 and the folder 20.

The coupling portion 122b of the sliding module portion 120 is coupled to the case portion 110, and the sliding member 122 of the sliding module portion 120 is coupled to the folder 20 to face the top surface of the folder 20.

Since the screw guide holes 122e are formed in the sliding member 122, they allow threaded engagement of the screws 200 engaged with the guide stopper portions 124 therewith and guide the threaded screws 200 for screw-engagement with the case portion 110.

The elastic members 123 are provided in the operation space 121a formed in the base member 121.

The ends 123a of the elastic members 123 are coupled to the coupling space 122d formed in the sliding member 122.

In this state, as shown in FIGS. 6, 7, 10, and 11, when a user opens the folder 20 from the main body 10 by rotating the folder 20 outwardly, the sliding member 122 also rotates and the moving portion 122a of the sliding member 122 slides outwardly by the rotation.

Figure 7:
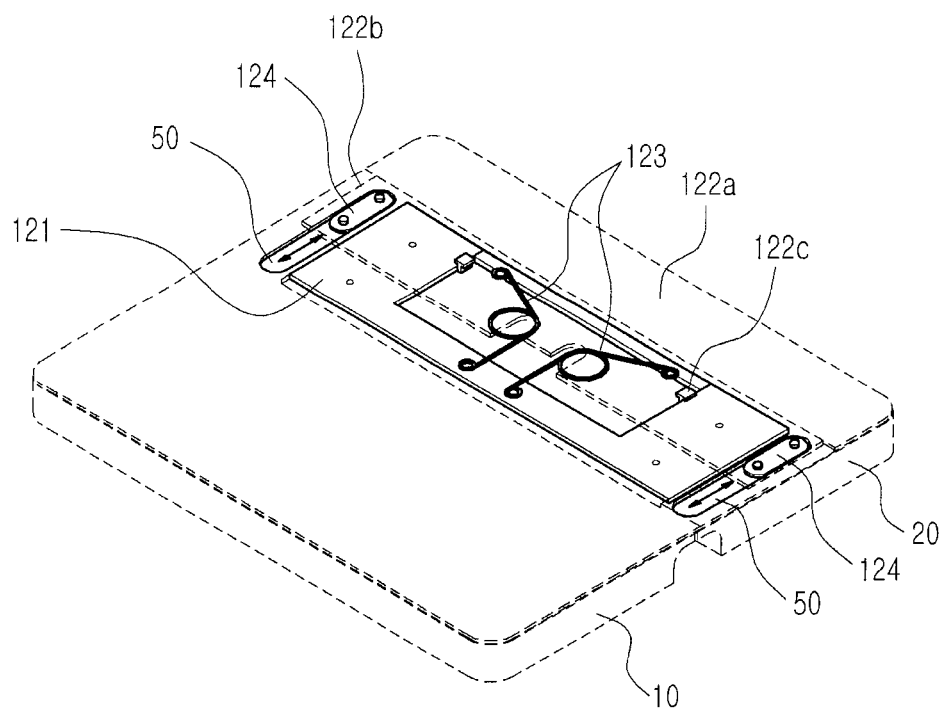
FIG. 7 is an internal perspective view showing a post-operation state of a case for a portable communication device including a sliding module according to an embodiment of the present invention.
Figure 8:
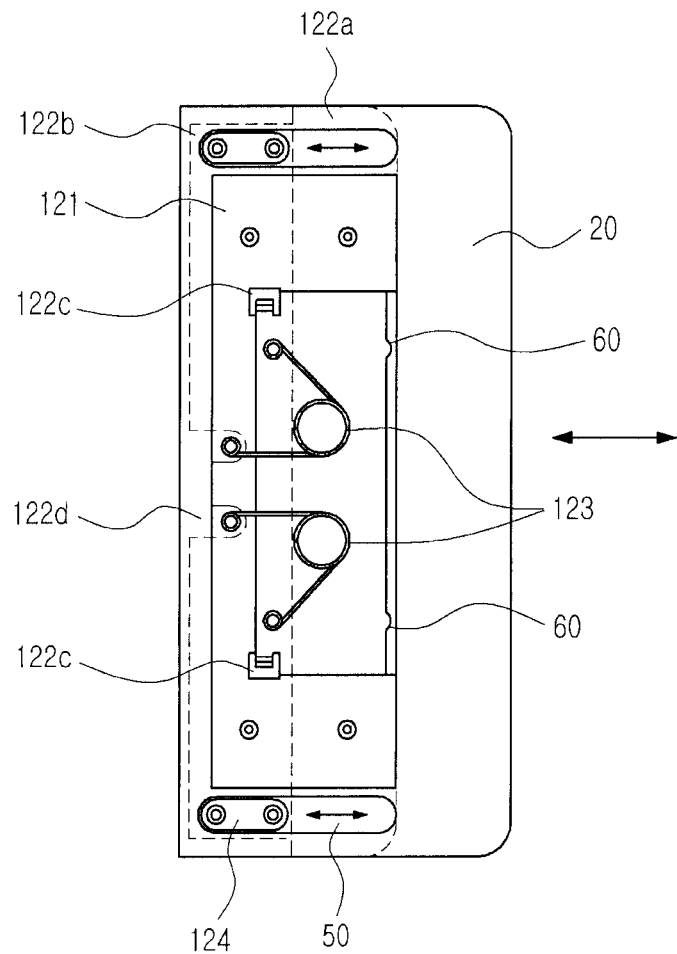
FIG. 8 is an internal plane view showing a pre-operation state of a case for a portable communication device including a sliding module according to an embodiment of the present invention.
Figure 9:
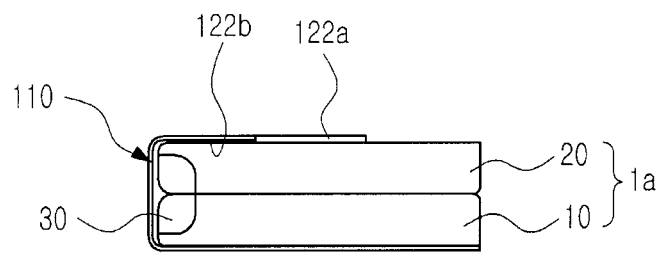
FIG. 9 is a side view showing a pre-operation state of a case for a portable communication device including a sliding module according to an embodiment of the present invention.
Figure 10:
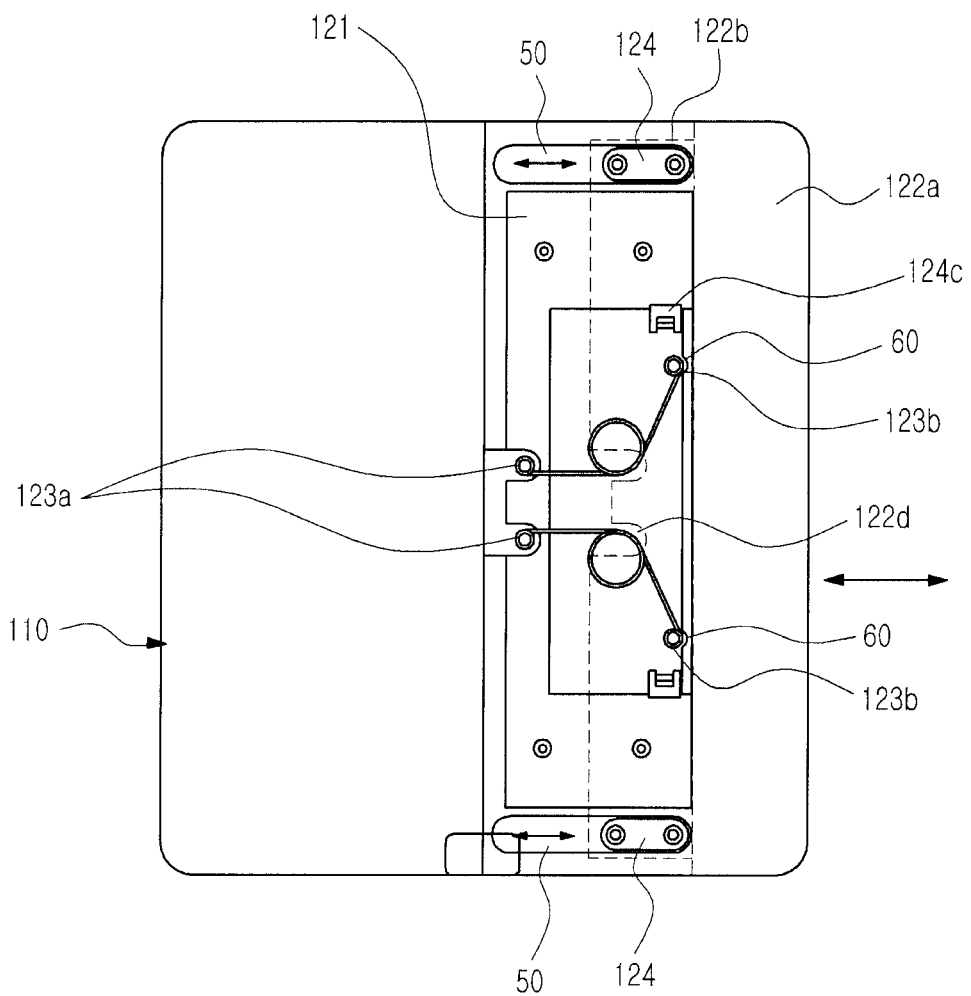
FIG. 10 is an internal plane view showing a post-operation state of a case for a portable communication device including a sliding module according to an embodiment of the present invention.

As shown in FIGS. 7 and 10, the moving portion 122a of the sliding member 122 slides by an elastic force provided by the elastic members 123 which is stretched from a compressed state.

Hence, the case portion 110 is opened without being folded (or wrinkled) by sliding movement of the sliding member 122, thereby making the exterior design of a product elegant.

The guide stopper portions 124 are guided to slide in the movement grooves 50, along with sliding of the sliding member 122. The guide stopper portions 124 come into contact with one ends of the movement grooves 50 to restrict the movement of the sliding member 122 at an end position.

Herein, the at least guide support portions 122c formed in the sliding member 122 slide and are guided, together with sliding of the sliding member 122, thereby supporting sliding of the sliding member 122.

Figure 11:
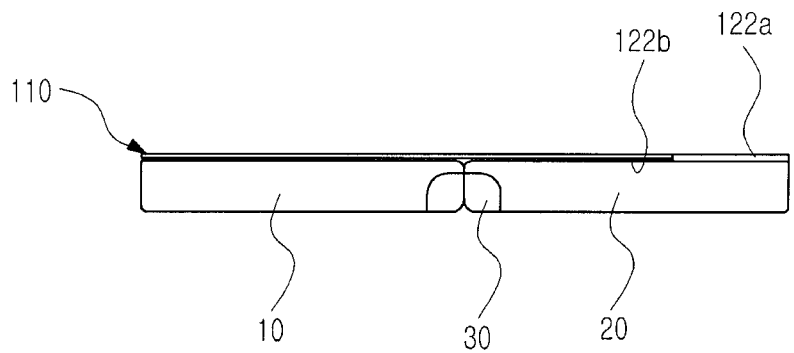
FIG. 11 is an internal side view showing a post-operation state of a case for a portable communication device including a sliding module according to an embodiment of the present invention.

As shown in FIGS. 7 and 11, in the folder 20 are formed the at least one stopper grooves 60 which are coupled to the other ends 123b of the elastic members 123 after sliding of the sliding member 122 to restrict the movement of the elastic members 123, such that the other ends 123b of the elastic members 123 are coupled to the stopper grooves 60 to restrict the movement of the elastic members 123.

In this state, as shown in FIGS. 4, 5, 8, and 9, when the user closes the folder 20, the sliding member 122 goes back to the original position by sliding and at the same time, the elastic members 123 are compressed.

The guide stopper portions 124 go back to the original position by moving together with the sliding member 122, and come into contact with the other ends of the movement grooves 50, thereby restricting the movement of the sliding member 122 at an initial position.

It will be obvious to those of ordinary skill in the art that the above-described case for a portable communication device having a sliding module according to the present invention is not limited to the foregoing embodiment and drawings, and various changes in form and details may be made therein without departing from the spirit and scope of the invention as defined by the appended claims.

What is claimed is:

1. A housing for a portable communication device having a main body, a folder, and a hinge device for rotatably coupling the main body with the folder, comprising:
    a case portion for covering the exterior of the portable communication device; and
    a sliding module portion provided on the case portion for providing a sliding movement when the main body is open or closed with respect to the folder via the hinge device.

2. The housing of claim 1, wherein the case portion is made of leather.

3. A housing for a portable communication device having a main body, a folder, and a hinge device for rotatably coupling the main body with the folder, comprising:
    a case portion for covering the exterior of the portable communication device; and
    a sliding module portion provided on the case portion for providing a sliding movement when the main body is open or closed with respect to the folder via the hinge device;
    wherein the sliding module portion comprises:
    a base member mounted on any one of the main body and the folder;
    a sliding member slidably coupled to the base member and coupled to the case portion to slide together with the case portion;
    at least one elastic member provided between the base member and the sliding member to provide an elastic force for the sliding member; and
    at least one guide stopper portion coupled to the case portion and the sliding member, to guide sliding of the sliding member and to restrict a movement of the sliding member.

4. The housing of claim 3, wherein a receiving recess for receiving the base member is formed in the main body or the folder, and the main body or the folder is provided with at least one movement groove for guiding and restricting a movement of the at least one guide stopper portion.

5. The housing of claim 4, wherein an operation space for accommodating the at least one elastic member and allowing the at least one elastic member to operate is formed in the base member, and at least one screw hole for screw-engagement with holes formed in the receiving recess is formed in the base member.

6. The housing of claim 3, wherein the sliding member comprises a moving portion and the case portion comprises a coupling portion, and wherein at least one guide support portion for supporting guiding movement of the at least one guide stopper portion is formed in the sliding member, and a coupling space is provided in the sliding member to allow coupling between ends of the at least one elastic member and the base member.

7. The housing of claim 6, wherein the coupling portion is formed to have a step with respect to the moving portion such that the coupling portion can be coupled to the case portion.

8. The housing of claim 3, wherein an ends of the at least one elastic member is coupled to the base member and another other ends of the at least one elastic member is coupled to the sliding member to provide an elastic force to the sliding member by compressing and stretching the at least one elastic member.

9. The housing of claim 3, wherein at least one stopper grooves is formed in the main body or the folder, the at least one stopper groove being coupled to the other end of the at least one elastic member after sliding movement of the sliding member to restrict a movement of the at least one elastic member.

10. The housing of claim 3, wherein in the sliding member are formed at least one screw guide hole with which at least one screw engaged with the least one guide stopper portion is threadedly engaged such that the at least one threaded screws is guided to be engaged with the case portion.

11. A case for a portable communication device having a main body, a folder, and a hinge device for rotatably coupling the main body with the folder, comprising:
    a case portion covering at least a portion of an exterior of the portable communication device; and
    a sliding module portion coupled to the case portion and providing a sliding movement while the folder is folding or unfolding with respect to the main body via the hinge device.

12. The case of claim 11, wherein the case portion covers a first portion of the exterior of the communication device and the sliding module portion covers another portion of the exterior.

13. The case of claim 11, wherein the case portion wraps around the hinge portion.

14. The case of claim 11, wherein the sliding movement causes the sliding module portion and the case portion to slide together.

15. The case of claim 11, wherein the case portion is made of a flexible material, and the sliding movement prevents folding or wrinkling of the flexible material when the folder is unfolded with respect to the main body.

16. The case of claim 15, wherein the flexible material is one of leather, a fabric and a synthetic resin.

17. The case of claim 11, wherein the sliding module portion comprises at least one elastic member to provide an elastic force for the sliding movement.

18. The case of claim 11, wherein the sliding module portion comprises:
    a base member mounted on any one of the main body and the folder;
    a sliding member slidably coupled to the base member and coupled to the case portion to slide together with the case portion;
    at least one elastic member provided between the base member and the sliding member to provide an elastic force for the sliding member; and
    at least one guide stopper portion coupled to the case portion and the sliding member, to guide sliding of the sliding member and to restrict a movement of the sliding member.

* * * * *

UNITED STATES PATENT AND TRADEMARK OFFICE
CERTIFICATE OF CORRECTION

PATENT NO. : 8,462,489 B2 Page 1 of 1
APPLICATION NO. : 12/898919
DATED : June 11, 2013
INVENTOR(S) : Won-Tae Kim et al.

It is certified that error appears in the above-identified patent and that said Letters Patent is hereby corrected as shown below:

In the Claims:

Column 6, Claim 8, Line 11 should read as follows:
--...another end of the last...--

Column 6, Claim 10, Line 23 should read as follows:
--...one threaded screw is...--

Signed and Sealed this
Thirteenth Day of August, 2013

Teresa Stanek Rea
*Acting Director of the United States Patent and Trademark Office*